United States Patent [19]

Perdelwitz, Jr. et al.

[11] Patent Number: 4,885,200

[45] Date of Patent: Dec. 5, 1989

[54] INFANT CAR SEAT LINER

[75] Inventors: Lee E. Perdelwitz, Jr., Tacoma, Wash.; David E. Hanke, San Diego, Calif.

[73] Assignee: Weyerhaeuser Company, Tacoma, Wash.

[21] Appl. No.: 188,473

[22] Filed: Apr. 29, 1988

[51] Int. Cl.⁴ .............................................. B32B 3/10
[52] U.S. Cl. .................................. 428/136; 428/137; 428/138; 428/156; 428/171; 428/172; 428/192; 428/280; 428/286; 428/297; 428/326; 428/903; 428/920; 5/483; 5/484; 5/487; 297/219; 297/229; 297/DIG. 5; 604/367; 604/378; 604/379; 604/381; 604/385.1; 604/393
[58] Field of Search ............. 428/280, 137, 282, 138, 428/284, 218, 285, 136, 286, 288, 297, 298, 903, 192, 326, 920, 913, 156, 171, 172; 297/219, 229, DIG. 5; 5/483, 484, 487; 604/385.1, 379, 367, 378, 381, 393

[56] References Cited

U.S. PATENT DOCUMENTS

| | | | |
|---|---|---|---|
| 30,972 | 6/1982 | Kyle et al. | 428/219 |
| 247,368 | 2/1978 | Whitehead | D24/51 |
| 253,674 | 12/1979 | Whitehead | D24/51 |
| 254,097 | 2/1980 | Richards | D2/225 |
| 254,098 | 2/1980 | Richards | D2/225 |
| 254,099 | 2/1980 | Richards | D2/225 |
| 257,084 | 9/1980 | Fuller et al. | D6/48 |
| 257,085 | 9/1980 | Fuller et al. | D6/48 |
| 257,086 | 9/1980 | Fuller et al. | D6/48 |
| 266,802 | 11/1982 | Gooding | D6/5 |
| 272,190 | 1/1984 | Sneider | D24/51 |
| 276,073 | 10/1984 | Whitehead | D24/51 |
| 283,475 | 4/1986 | Reece | D6/611 |
| 1,442,056 | 1/1923 | Edmonds . | |
| 2,788,003 | 4/1957 | Morin | 128/284 |
| 2,990,101 | 6/1961 | Mead et al. | 229/53 |
| 3,016,599 | 1/1962 | Perry | 28/78 |
| 3,405,031 | 11/1968 | Sisson | 162/195 |
| 3,441,468 | 3/1969 | Siggel et al. | 161/169 |
| 3,477,433 | 11/1969 | Dillon | 128/290 |
| 3,501,369 | 3/1970 | Drelich et al. | 161/150 |
| 3,542,634 | 11/1970 | Such et al. | 161/88 |
| 3,556,936 | 1/1971 | Miyamoto | 162/272 |
| 3,570,491 | 3/1971 | Sneider | 128/290 |
| 3,706,626 | 2/1972 | Smith et al. | 161/37 |

(List continued on next page.)

FOREIGN PATENT DOCUMENTS 974107 9/1975 Canada .
1326915 11/1970 United Kingdom .
2061339 10/1980 United Kingdom .

OTHER PUBLICATIONS

National Highway Traffic Safety Administration DOT Regulations 49 CFR Sections 571.213 and 571.302.

(List continued on next page.)

Primary Examiner—Ellis P. Robinson
Assistant Examiner—Pat Ryan
Attorney, Agent, or Firm—Klarquist, Sparkman, Campbell, Leigh & Whinston

[57] ABSTRACT

A disposable infant seat liner in accordance with the present invention includes an upper section, a middle section and a lower section. Plural shoulder strap receiving slotways are provided in the upper section. These slotways may be accessible from side edges of the infant seat liner. In one embodiment, three shoulder strap receiving positions are provided at each side of the upper section to accommodate shoulder straps of various infant seat designs. First and second leg or crotch strap receiving slotways are also provided in a lower section of the infant seat liner. In one specific embodiment, a Y-shaped leg strap receiving slotway is positioned below an upwardly facing U-shaped slotway. In another embodiment, the lower slotway is T-shaped. Arched side cuts may also be provided in the central section of the infant seat liner to accommodate waist straps and to facilitate fitting of the infant seat liner to an infant car seat. The slotways, cuts and slits may be selectively openable with perforations being provided for this purpose. In this latter case, a user need only open those perforations required to fit the infant seat liner to the user's particular infant seat.

46 Claims, 4 Drawing Sheets

U.S. PATENT DOCUMENTS

| | | | |
|---|---|---|---|
| 3,717,150 | 2/1973 | Schwartz | 128/284 |
| 3,765,997 | 10/1973 | Dunning | 161/141 |
| 3,809,606 | 5/1974 | Stansbrey | 162/194 |
| 3,881,490 | 5/1975 | Whitehead et al. | 128/287 |
| 3,888,248 | 6/1975 | Moore et al. | 128/156 |
| 3,891,157 | 6/1975 | Justus | 242/56.2 |
| 3,903,890 | 9/1975 | Mesek et al. | 128/287 |
| 3,927,673 | 12/1975 | Taylor | 128/287 |
| 3,971,381 | 7/1976 | Gibson | 128/296 |
| 3,996,825 | 12/1976 | Terry | 83/53 |
| 4,047,534 | 9/1977 | Thomaschefsky et al. | 128/461 |
| 4,078,124 | 3/1978 | Prentice | 429/144 |
| 4,079,739 | 3/1978 | Whitehead | 128/290 R |
| 4,082,886 | 3/1978 | Butterworth et al. | 428/284 |
| 4,100,324 | 7/1978 | Anderson et al. | 428/288 |
| 4,129,132 | 12/1978 | Butterworth et al. | 128/287 |
| 4,160,059 | 7/1979 | Samejima | 428/288 |
| 4,170,680 | 10/1979 | Cumbers | 428/195 |
| 4,182,170 | 1/1980 | Grupp | 83/177 |
| 4,188,065 | 2/1980 | Meeker | 297/485 |
| 4,196,245 | 4/1980 | Kitson et al. | 428/198 |
| 4,257,842 | 3/1981 | Ciaccia et al. | 162/117 |
| 4,275,105 | 6/1981 | Boyd et al. | 428/198 |
| 4,286,030 | 8/1981 | Moore | 429/253 |
| 4,289,580 | 9/1981 | Elston et al. | 162/109 |
| 4,296,168 | 10/1981 | Ambrose | 428/288 |
| 4,315,965 | 2/1982 | Mason et al. | 428/198 |
| 4,333,979 | 6/1982 | Sciaraffa et al. | 428/198 |
| 4,381,783 | 5/1983 | Elias | 604/368 |
| 4,425,126 | 1/1984 | Butterworth et al. | 604/366 |
| 4,425,130 | 1/1984 | DesMarais | 604/389 |
| 4,429,001 | 1/1984 | Kolpin et al. | 428/283 |
| 4,458,042 | 7/1984 | Espy | 524/14 |
| 4,478,453 | 10/1984 | Schutz | 297/219 |
| 4,488,928 | 2/1984 | Ali Khan et al. | 156/495 |
| 4,493,868 | 1/1985 | Meitner | 428/171 |
| 4,500,580 | 2/1985 | Luciani | 428/43 |
| 4,548,856 | 10/1985 | Ali Khan et al. | 428/171 |
| 4,573,986 | 3/1986 | Minetola et al. | 604/366 |
| 4,578,071 | 3/1986 | Buell | 604/379 |
| 4,609,580 | 9/1986 | Rockett et al. | 428/198 |
| 4,619,862 | 11/1986 | Sokolowski et al. | 428/221 |
| 4,620,466 | 11/1986 | Jumel et al. | 83/177 |
| 4,621,004 | 11/1986 | Madsen | 428/80 |
| 4,629,457 | 12/1986 | Ness | 604/382 |
| 4,647,497 | 3/1987 | Weeks | 428/284 |
| 4,650,481 | 3/1987 | O'Connor et al. | 604/380 |
| 4,655,877 | 4/1987 | Horimoto et al. | 162/146 |
| 4,752,349 | 6/1988 | Gebel | 156/267 |
| 4,769,023 | 9/1988 | Goebel et al. | 604/385 R |

OTHER PUBLICATIONS

Brochure "GGT and Gerber Camsco . . . Automation Technology for the Furniture Industry".
Exhibit Rankin et al.
Copyright Registration VAU 98,854 for Universal Disposable Children's Car Seat Insert, issued Jul. 17, 1986.
Rankin Enterprises Children's Car Seat Cover Patterns 1001, 2002, 3003, 4004, 5005, 6006 and 7007.
Nanci Industries brochure showing prior art car seat/cradle covers models 801, 802, 811, 813, 831, 851, 852, 853, 861, 875, 161, 215, 122, 111, 152 and 142.
Baby Dreams promotional materials showing a prior art Infant Car Seat Cover Sketch of prior art cloth infant seat liner.
Sketch of prior art Nanci Industries "Safe & Sound" cloth infant seat cover.
Sketch of Diplomat Corp. Style 29-3 cloth infant seat cover.
Sketch of "Tailored Babyform" cloth infant seat cover from Tailored Baby, Inc.
Sheets of measurements of prior art infant car seat/carrier dimensions.
The following prior art infant car seats and cover, shown in Exhibit H: Cosco/Peterson Safe-T-Seat; Cosco/Peterson Safe & Snug; Cosco/Peterson Cosco Commuter; Strollee Wee Care 610; Strolee 612; Fisher-Price Carseat; Strolee Wee Care 618; Century 400 XL; Fisher-Price Infant Seat; Questor Kwantet One-Step; Century 2000 STE; Evenflo Maxi-Mite; Cosco Day Cradle; Century 580 Infant Seat; Dyno-O-Mite by Evenflo; Kolcraft Rock n'Ride; Kolcraft Carri-Cradle; Century Kanga-Rock-A-Roo; Cosco/Peterson First Ride; Century Infant Love Seat; Collier/Keyworth CK Classic; Cosco Commuter; and Gerry Guardian.

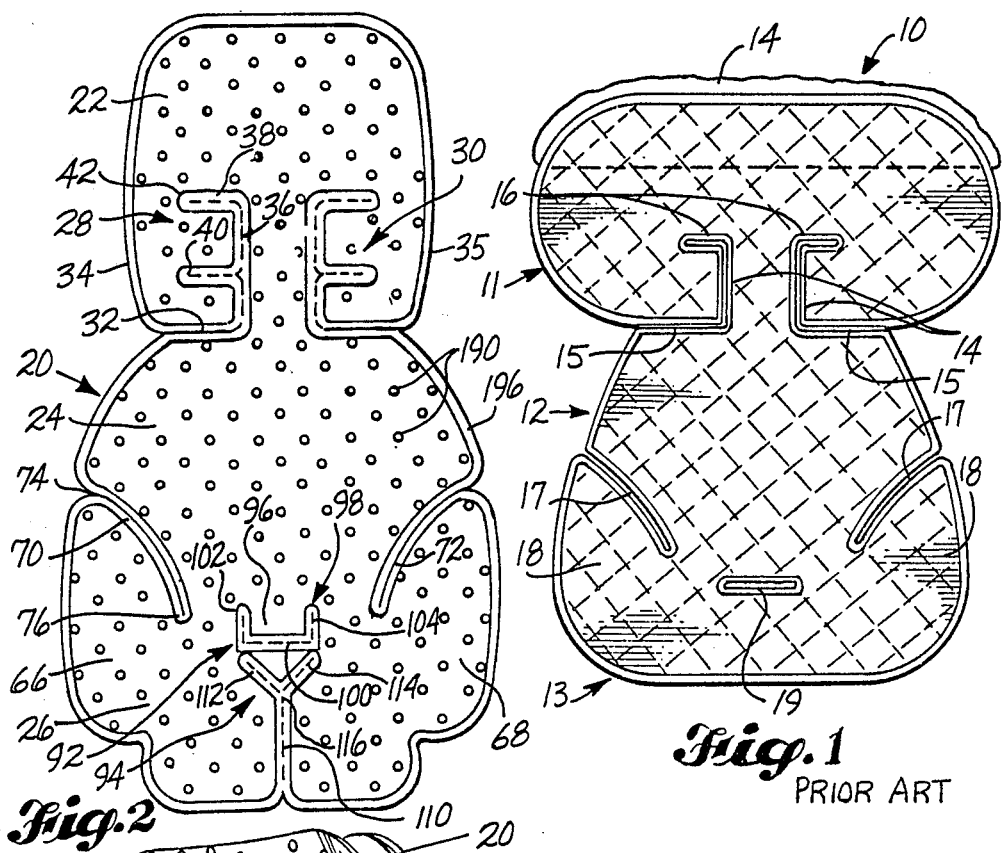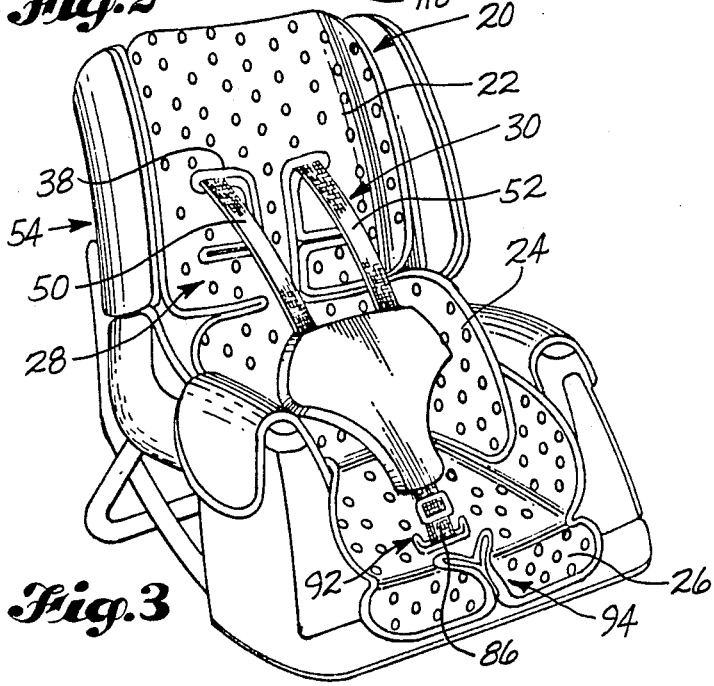

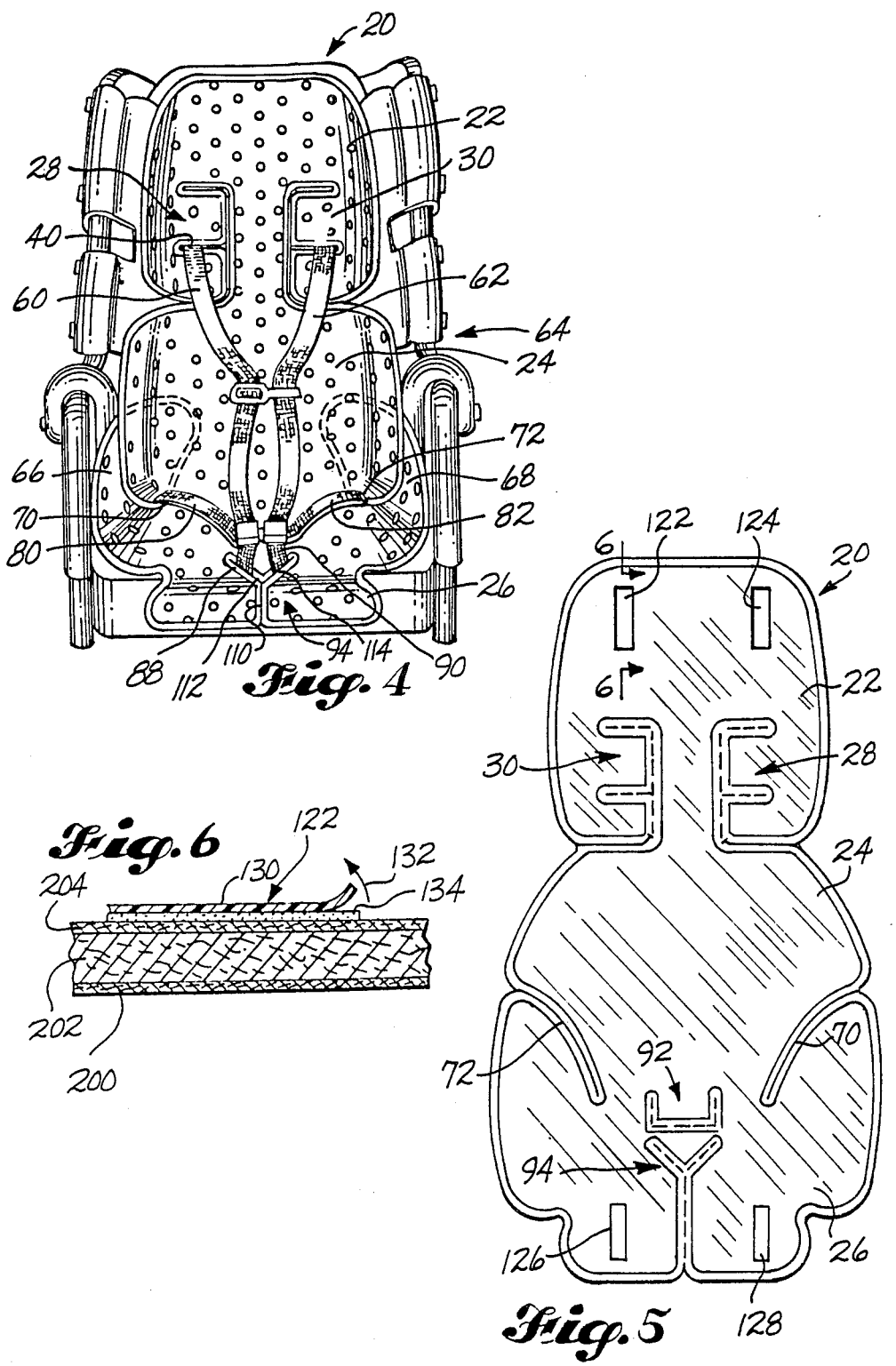

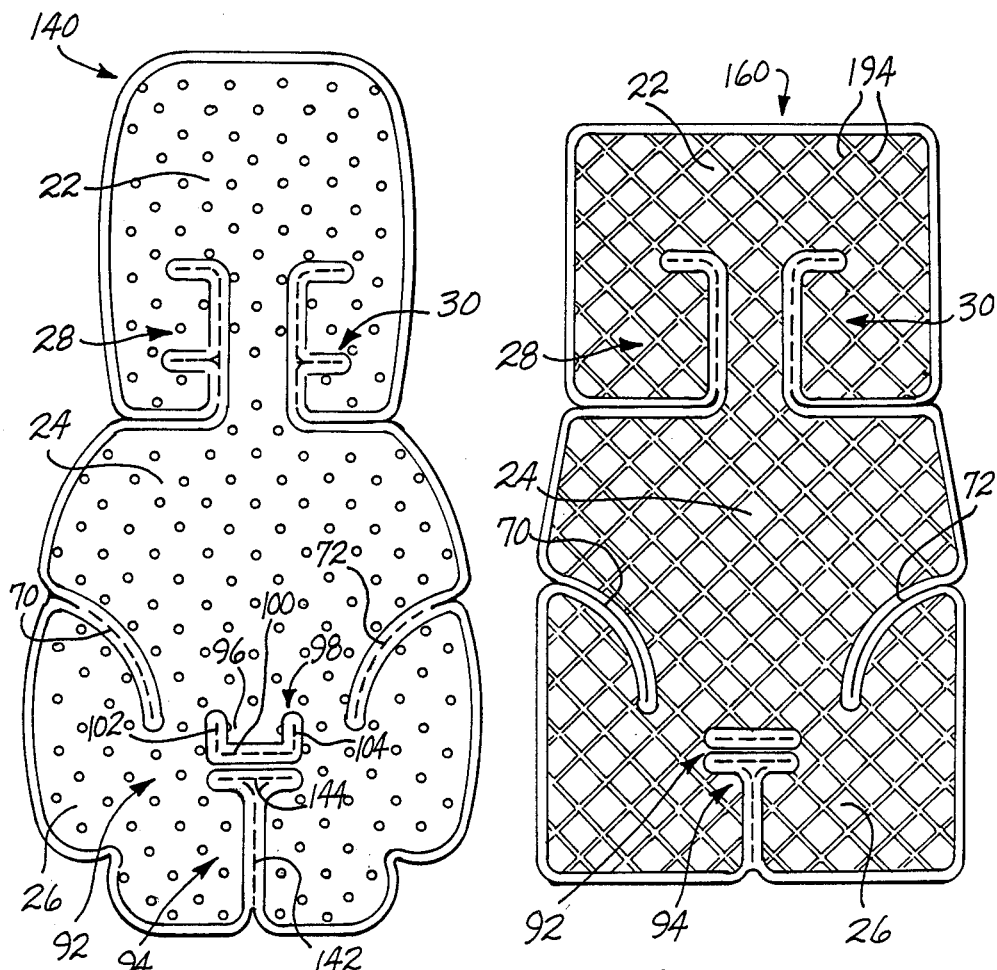

INFANT CAR SEAT LINER

BACKGROUND OF THE INVENTION

The present invention relates to liners for infant car seats and more specifically to limited life or disposable liners for use with infant car seats of a variety of different sizes and shapes.

Infant car seats are required in many states and are used by many parents. These seats are designed to protect the infant by reducing the possibility of injury in the event of a traffic accident. The infant car seats are provided with a structure which enables the infant seat to be affixed to the seat of a vehicle. Straps, which can be fastened around the infant, are provided to retain the infant in the infant seat.

Infant seats are subject to spills of food, beverages and to otherwise being soiled. The infant seats can be difficult to clean and keep sanitary. Also, infant seat straps typically pass through slots in the seat which are particularly difficult to clean.

The seats are commonly of a cloth material which is difficult to clean or of plastic or vinyl which is somewhat easier to clean. However, plastic or vinyl infant seats tend to be uncomfortable, particularly to the sensitive skin of an infant. When exposed to direct sunlight in the summer, such materials tend to become extremely hot and sticky. In the winter, plastic and vinyl materials become uncomfortably cold. Moreover, plastic and vinyl infant seats are not soft to the touch and typically cannot be removed for washing.

It has been proposed to use liners for infant car seats. A typical liner is of a multi-piece cloth construction with a pocket for receiving the upper end of an infant car seat. Cloth liners of this type are often held in place by ties and include strap receiving slots through which the infant seat straps are threaded or positioned when the liners are in place.

Although cloth liners can be removed and washed, this requires some effort, particularly when straps need to be threaded through slots in the liners for removal and replacement. Consequently, there is a tendency for users to leave the liners in place even when somewhat soiled. In addition, unless an individual has a spare cloth liner, the infant seat is used without a liner until the washing is complete. Known cloth liners are frequently sewn so that they are relatively time consuming and labor intensive to produce. Fuller et al. U.S. Design Pat. Nos. 257,084, 257,085, and 257,086; Schutz U.S. Pat. No. 4,478,453; Reece U.S. Design Pat. No. 283,475; and U.S. Pat. No. 4,188,065 of Meeker are examples of this type of liner.

In addition, U.S. Design Pat. No. 266,802 of Gooding (FIG. 4 of the Gooding patent) appears to show a plastic or vinyl infant car seat liner of stacked or laminated components which provide raised cushioning sections. The Gooding design would suffer from many of the drawbacks mentioned above in connection with plastic or vinyl infant seats.

U.S. Pat. No. 4,621,004 of Madsen describes a disposable car seat liner as including a disposable diaper type liquid absorbent material, such as cotton batting, on a water repellant backing material, such as vinyl, and a permeable facing which holds the absorbent material in place on the backing. Paper facing or a cotton polyester blend fabric material is described as being a suitable facing. In Madsen, a pair of L-shaped sides are described as being adapted for attachment to a body, for example, by stitching or sewing. The upper shoulder straps of the infant seat shown in Madsen pass above the level of the liner. Thus, the Madsen design illustrates a multi-piece liner that would not provide any protection for an infant's neck and head.

Another prior art infant car seat liner is shown in FIG. 1. This illustrated liner is of cloth and has the same cleaning problems and drawbacks as the previously described cloth liners. For example, such a liner is not disposable and must be washed when it is soiled. Moreover, a cloth liner of this type normally remains in use when soiled until a user arrives home and can wash it. The liner 10 has an upper section 11, a mid section 12 and a lower section 13. The upper section 11 is elongate, being wider than long and has semi-circular side edges. A flap 14 is attached to the back of the upper section 11 to form a pocket which fits over the top of the infant seat to hold the liner in place. A pair of outwardly facing generally U-shaped slits 14 are formed in the upper section 11. The lower arms 15 of each of the U-shaped slits 14 extend to the respective side edges of the liner and divide the upper section 11 from the mid section 12. The upper arms 16 of the slits, as well as the lower arms 15, accommodate the upper shoulder straps of an infant car seat when the liner is in place. Downwardly and inwardly extending curved slits 17 separate the mid-section 12 from the side portions 18 of the liner lower section 13. A single leg or crotch strap slot 19 is formed in the lower section 13.

Liners of the type shown in FIG. 1 are not disposable and generally provide an optimum fit of a relatively few of the many various types and sizes of infant seats that are presently available.

Therefore, a need exists for an improved limited life or disposable infant seat liner for infant car seats and more particularly for infant seat liners of the type having a pair of shoulder straps and at least one leg strap, the improved infant seat liner being directed towards overcoming these and other disadvantages of the prior art.

SUMMARY OF THE INVENTION

The inventors were assigned the task and have achieved a design for a universal infant car seat liner which fits substantially any commercially available infant car seat sold for newborn infants to those sold for toddlers of about forty pounds. Such an infant seat liner must accommodate the various placements of shoulder, waist and crotch or leg straps, as well as the various infant seat shapes, that are found in today's infant car seat designs.

In accordance with the present invention, an infant seat liner is provided with plural strap receiving slits or slotways. These slits or slotways are designed and positioned to permit placement of the infant seat liner in the infant seat with such slits or slotways aligned with both the upper shoulder straps and lower crotch or leg straps of any of a wide variety of infant car seats. It is highly desirable that one size of infant seat liner fit as many commercially available infant seats as possible. This makes it easy for a consumer to purchase such liners without the worry of having the wrong size or wrong style of liner for the user's particular brand of infant car seat.

As another objective of the invention, an infant seat liner of the present invention is efficient and inexpensive to manufacture so that it can be replaced when it becomes soiled. In this regard, the infant seat liner is easy to replace so that it may quickly be replaced at any time, and under virtually any conditions. In one preferred embodiment, instruments, such as scissors, and difficult maneuvers, such as threading straps through strap slots are not needed during replacement.

As another object of the invention, the infant seat liner is absorbent so as to retain any spills that might occur. In addition, the infant seat liner of the present invention does not transmit such spills to the difficult to clean infant car seat itself.

Another object of the present invention is to provide an infant seat liner which is stiff enough to be placed in an infant seat and hold its shape, but is still able to conform to the shape of the seat. An optional fastening system may be used to secure the liner in position.

Although a disposable infant seat liner is desired, the liner of the present invention is also durable so that it maintains its integrity during use. For the safety of infants, the infant seat liner is not easily pulled apart.

Another object of the present invention is to provide an infant seat liner which does not significantly retain heat and which provides insulation from both hot and cold infant seats.

A still further object of the present invention is to provide an infant seat liner which provides protection of an infant's head, neck and shoulders as well as the infant's back, seat and legs. The liner simultaneously protects the infant car seat from soiling and wearing out.

A further object of the present invention is to provide an attractive, soft, and comfortable infant seat liner.

After much work, the inventors were able to provide a preferred embodiment of an infant car seat liner that substantially meets these diverse objectives, together with other designs. It took a great many tries and a number of changes before these objectives could be met. Minor modifications to this infant seat liner became of great importance.

The preferred embodiments of the present invention have a number of features which individually and collectively allow these designs to function as extremely versatile infant car seat liners for a wide variety of infant car seat styles and sizes.

In accordance with one aspect of the invention, a disposable infant seat liner has upper, middle and lower sections. In the illustrated embodiments, downwardly and inwardly extending arched side slits or cuts are provided in the middle section of the liner. When the infant seat liner is in position on an infant car seat, portions of the liner adjacent the side slits overlap one another to conform the liner to the shape of the infant car seat. The arched slits allow a transverse hinge line between the portion of the liner against the back of the seat and the portion of the liner against the base of the seat to be shifted longitudinally. This, together with leg strap receiving slotways and shoulder strap receiving positions as explained below, allows shifting of the hinge lines to various locations along the infant seat liner to optimize the fit of the liner to the infant car seat.

The illustrated designs also have at least two shoulder strap receiving positions at each side of the upper infant seat liner section. Two upper shoulder strap receiving positions are required to accommodate many of the various strap configurations. Also, it has been found that three such positions provide a more universal accommodation of the various placements of the upper infant car seat shoulder straps. The shoulder strap receiving positions are preferably connected by a pathway with the outer edge of the liner so that the shoulder straps do not have to be threaded through slits during the placement of the liner on an infant car seat.

At least one, and preferably two leg or crotch strap receiving slotways are provided in the lower liner section. In one form of the invention, the crotch or leg strap receiving slotways comprise a lower slotway with upwardly extending and spaced apart or diverging slits accessible from an edge of the liner and an upper slotway. A specific form of this lower slotway is generally Y-shaped and a specific form of the upper slotway is U-shaped. The Y-shaped configuration facilitates shifting of crotch straps upwardly and downwardly in this lower slotway to more closely align the shoulder straps in appropriate shoulder strap receiving slotways. In another specific form of the invention, the lower slotway is generally T-shaped and the other upper slotway is U-shaped or a straight transversely extending slit. Although beneficial, the T-shaped slotway permits adjustment of the crotch or leg straps of infant car seats to a somewhat lesser degree than does a slotway with upwardly extending and spaced apart or diverging slits, such as the Y-shaped slotway.

The lower leg strap receiving slotway is typically connected to the lower edge of the liner. This permits access to the lower slotway without the need for threading straps through slits. Many infant car seat designs have straps placed to use the lower slotway. Also, the portions of the lower leg supporting section of the liner adjacent to the lower leg strap receiving slotway may be spread apart to provide access to the leg strap receiving latch of some infant car seat designs.

To preserve the integrity of the infant seat liner, the various slits, pathways and slotways of the liner may be closed until selectively opened by a user to the extent required to accommodate the straps of the user's infant car seat. More specifically, these slotways, slits and pathways may be retained in a closed position by weakened areas of the liner, such as perforations, until the perforations are severed by a user to the extent selected by the user for positioning of the various straps.

These and other objectives, features, and advantages of the present invention will become apparent with reference to the following description and drawings.

BRIEF DESCRIPTION OF THE DRAWINGS

FIG. 1 is a front view of a prior art infant car seat liner;

FIG. 2 is a front view of a first embodiment of an infant seat liner of the present invention;

FIGS. 3 and 4 are views showing the infant seat liner of FIG. 2 positioned on different styles of infant car seats;

FIG. 5 is a rear view of the infant seat liner of FIG. 2, illustrating one form of an optional fastening system for releasably securing the infant seat liner to the infant car seat;

FIG. 6 is a sectional view of a portion of the infant seat liner and of a tape fastener used in one form of the invention, taken along lines 6—6 of FIG. 5;

FIG. 7 is a front view of an alternate embodiment of an infant seat liner of the present invention;

FIG. 8 is a front view of another embodiment of an infant seat liner in accordance with the present invention;

DETAILED DESCRIPTION OF THE PREFERRED EMBODIMENTS

Figure 9:
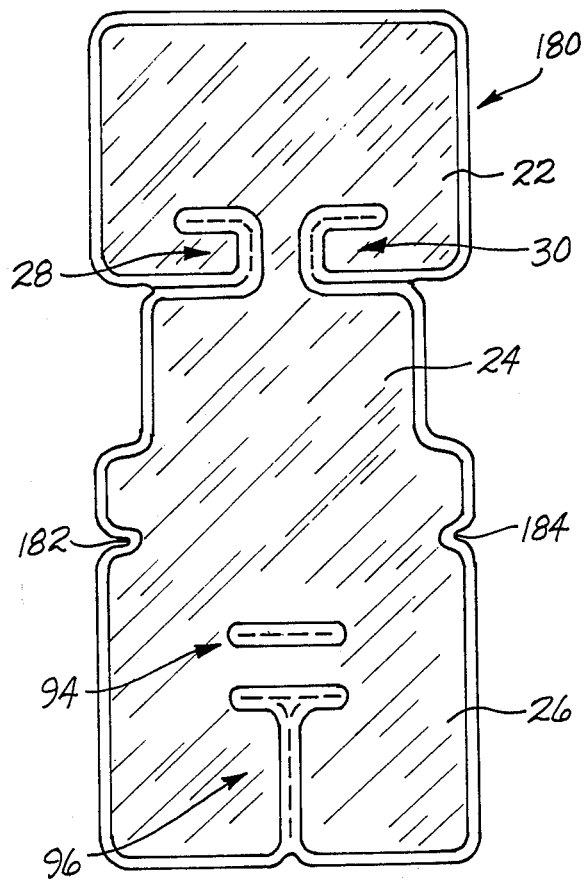
FIG. 9 is a front view of a further embodiment of an infant seat liner of the present invention.

For convenience, and unless otherwise indicated, in the present description all length dimensions are taken from the bottom edge of the infant seat liner.

A first embodiment of an infant car seat liner 20 in accordance with the present invention is shown in FIG. 2. This infant seat liner has an upper section 22, a middle section 24, and a lower leg supporting section 26. The optimum total length of the liner 20 is about thirty-three inches. However, the total length typically ranges from about thirty inches to about thirty-five inches to best cover a wide variety of infant car seats from top to bottom. The typical thickness of the pad is about three-eighths of an inch in uncompressed areas.

The upper section 22 is generally rectangular in shape, being longer than wide. The section 22 has rounded corners, a straight upper edge and slightly rounded side edges. Although variable, the optimum width of the upper section 22 is approximately twelve and one-half inches and ranges from about eleven and one-half inches to about fifteen inches. A pair of shoulder strap receiving pathways 28, 30 are provided in the upper section 22 along either side of the longitudinal center line of the infant seat liner.

Since shoulder strap receiving pathways 28, 30 are mirror images of one another, only the pathway 28 will be described in detail. In general, the pathway 28 extends inwardly along a first path section 32 from a side edge 34 of the upper body section 22 toward the center of the infant seat liner body. At a location spaced inwardly from edge 34 and spaced outwardly from the longitudinal center line of the liner, the pathway turns upwardly along a second path section 36 and then outwardly along a third path section 38 toward the edge 34. Path section 38 terminates short of the side edge 34. A fourth path section 40 is positioned between path sections 32 and 38. This fourth path section extends from path section 36 toward the side edge 34 and also terminates short of the side edge. Thus, the pathway 28 is of a reversed E-shaped configuration. The pathway 30 extends from the liner side edge 35 and is generally E-shaped.

Although pathway 28 may be a cut or otherwise open with each of the path sections being totally slit, preferably the path sections are selectively openable by the user. Although scissors may be used with indicia on the liner or instructions guiding the user in making the required cuts, in the illustrated embodiment the path sections are formed at least in part by weakened areas positioned in a densified or compressed and bonded region 42 of the upper section 22. These weakened areas enhance the manual frangibility of the liner along the pathways in comparison to the unweakened ones. Although weakened areas such as score lines may be used, perforations positioned along the desired path sections are preferred. With this construction, the pathways are retained in a closed position until the perforations are severed by a user. The user then determines the extent of such severing for positioning of shoulder straps from the user's infant seat at the desired position within the shoulder strap receiving pathway. This approach maintains the integrity of the infant seat liner as only the path sections of pathways 28, 30 needed to accommodate the shoulder straps are opened. However, since the path section 32 is typically always used, it may simply be cut instead of perforated.

Therefore, the path sections 32, 40 and 38 provide three shoulder strap receiving positions into which shoulder straps of an infant car seat may be inserted to optimize the fit of the infant seat liner to an infant car seat.

The path section 32, as well as the corresponding path section at the opposite side of the infant seat liner, divides the upper section 22 from the middle section 24.

The distance from the bottom edge of the infant seat liner to the path section 32 is typically from about nineteen to twenty-three inches with an optimum distance being about twenty and one-fourth inches. The distance from the bottom edge of the infant seat liner to the middle path section 40 is about twenty-two to twenty-three inches, with the optimum distance being about twenty-two and three-eighths inches. In addition, the distance from the bottom edge of the liner to the top path section 38 typically ranges from about twenty-five to twenty-nine and one-half inches, with an optimum distance being about twenty-five and three-fourths inches. The path sections 38 and 40 extend transversely from path section 36 a distance of about two inches. The path sections 32, 38 and 40 are substantially perpendicular to the longitudinal center line of the infant seat liner while the path section 36 is substantially parallel to the longitudinal center line. In addition, the path section 36 is spaced approximately three inches from the corresponding path section of the pathway 30.

When opened, the path sections 32, 38 and 40 receive the upper shoulder straps of the infant car seat. This is shown in FIG. 3 in which the upper car seat straps 50 of car seat 54 passes through the slot section 38 of slotway 28 and the shoulder strap 52 passes through the corresponding slot section of slotway 30 at the opposite side of the infant seat liner. The versatility of the design is shown by FIG. 4 in which an upper shoulder strap 60 of an infant car seat 64 is shown passing through the middle slot section 40 of slotway 28. The shoulder strap 62 at the other side of the infant seat passes through the corresponding slot section of slotway 30. The infant seat liner can be moved upwardly or downwardly in the infant car seat. This shifting of the liner allows the alignment of one pair of the shoulder strap slot sections with the shoulder straps and one of the lower car seat leg or crotch strap apertures, described below, with leg or crotch straps included in the infant seat liner.

Referring again to FIG. 2, the middle section 24 has rounded side edges and tapers upwardly from its narrowest width at its juncture with upper section 22 to its widest width at its lower boundary. Again, although variable, the narrowest width of middle section 24 is about twelve inches and the widest width of this section is from about seventeen and one-half to eighteen inches.

A pair of side sections 66, 68 are divided from the middle section 24 by respective inwardly and downwardly extending arched cuts 70, 72. These cuts 70, 72 may be selectively openable by a user, for example by tearing perforations which define the cuts. These cuts or slits accommodate the waist straps of certain infant seat designs. With reference to cut 70, these cuts extend from a point 74 at the side edge of the middle section 24 to a point 76 toward the bottom of the middle section. The distance from the lower edge of the infant seat liner to point 74 is typically from about twelve to thirteen and one-half inches with the optimum distance being about thirteen and one-eighths inches. The cut 70 has a four and five-eighths inch radius of curvature measured from the outer edge 35 of the infant seat liner 20. The distance from the lower edge of the infant seat liner to the center of the radius of curvature is typically from about seven and one-fourth to about eight and three-fourths inches with an optimum distance being approximately eight and one-quarter inches. The lower end 76 of the cut 70 is on a line which extends through the center of the radius of curvature and perpendicular to the longitudinal center line of the infant seat liner.

When placed in the infant car seat, as shown in FIGS. 3 and 4, the side sections 66, 68 extend upwardly along the respective sides of the infant car seat. As best seen in FIG. 4, the inner ends of the side sections extend behind the adjoining portions of the middle section 22. When in position, the overlapping portions of the middle section 22 hold the side portions 66, 68 in place.

Again, the cuts 70, 72 may each comprise a weakened area such as a score line or perforation so as to permit selective manual opening by a user. The use of indicia on the liner or instructions to guide a user who then must cut the liner with scissors to form cuts 70, 72 is possible, but much more inconvenient. As shown in FIG. 4, the inner portions of the cuts 70, 72 are positioned for receiving leg straps 80, 82 of the infant car seat design of this Figure. If the infant car seat does not have these leg straps, then cuts 70, 72 need not be as deep. To accommodate this variation, the cuts 70, 72 may be formed of a shallower slit portion with a perforated extension (see FIG. 7) which then is selectively opened by a user for car seats having these leg straps.

Common infant car seats have a single lower crotch or leg strap 86, as shown in FIG. 3, or double lower crotch straps 88, 90 as shown in FIG. 4. These crotch or leg straps may be placed on the front of the car seat as shown in FIG. 4 or within the car seat as shown in FIG. 3.

The infant seat liner of FIG. 2 has first and second leg strap receiving slotways, such as an upper slotway 92 and a lower slotway 94, positioned in the lower leg supporting section 26 of the infant seat liner. These two potential apertures are provided to accommodate different styles and placements of leg straps found in a wide variety of infant car seat designs.

The illustrated upper slotway 92 includes a flap 96 defined in this case by an upwardly facing U-shaped cut or perforation 98 formed in an upper end portion of leg supporting section 26. The perforation 98 includes a transversely extending lower edge section 100 and a pair of upwardly extending side edge sections 102, 104. The lower edge section 100 is perpendicular to the longitudinal center line of the infant seat liner while the side edges 102, 104 are parallel to the longitudinal center line. The distance from the lower edge of the infant seat liner to lower edge section 100 ranges from about six and one-eighth inches to seven and one-half inches with an optimum distance being about seven inches. The width of edge 100 is about three inches while the length of the side edges 102, 104 is about one and one-fourth inches. The perforations 100, 102 and 104 may be selectively opened to form the flap 96. Alternately, these perforations may be replaced by slits, although this compromises the pad integrity to a certain extent in situations where the flap 96 would not normally be used. Also, slits would permit leakage of spills and the like to a greater degree than perforations. In other words, perforations provide a better liquid seal than slits. As shown in FIG. 3, the lower leg or crotch strap or straps 86 of the infant car seat can pass through the opening formed by the flap 96. The use of a flap 96 permits some adjustment of the position of the infant seat liner in the infant seat to accommodate a number of different crotch strap locations while still having the upper shoulder straps in alignment with upper shoulder strap receiving slots.

The illustrated lower leg strap receiving slotway 94 of FIG. 2 comprises upwardly extending and spaced apart or diverging slits accessible from the lower edge of the lines and in the specific illustrated form comprises an upwardly facing Y-shaped perforation or cut positioned below the upper slotway 92. The Y-shaped perforation has a linear leg section 110 extending upwardly from the lower edge of the liner 20. This perforation also has two outwardly and upwardly oblique perforations 112, 114 extending upwardly toward the upper slotway 92 from the upper end 116 of the perforation 110. The distance from the lower edge of the infant seat liner to the end 116 of perforation 110 ranges from about four and three-fourths to five and one-half inches with the optimum length being about four and three-fourths inches. The upper ends of the perforations 112, 114 are positioned slightly below the transverse lower edge section 100 of the slotway 92. The distance from the end 116 to a plane through the ends of the sections 112, 114 is about one and one-quarter inches while the distance between the upper or distal ends of sections 112, 114 is about three inches.

The Y-shaped slotway 94 may be selectively opened by a user to accommodate lower crotch or leg straps such as double lower crotch straps 88 and 90 shown in FIG. 4. The opening formed by the perforations 112, 114 facilitate the adjustment of the infant seat liner to permit the placement of the crotch straps in position. The perforation 110 also allows the sections of the infant seat liner bounding this perforation to be folded downwardly out of the way for convenience in fitting infant car seats which have a connector below the seat level.

Although perforations 110 are typically opened to provide access to the perforations 112 and 114, this is not required. That is, if desired, perforations 112 and 114 may be opened while leaving perforations 110 closed to maintain pad integrity. Although perforations are prefered, weakened areas such as score lines may be used to enhance the manual frangibility of the lines along the lower slotways 92, 94 while still assisting in maintaining pad integrity. Also, instead of perforations and with a sacrifice of some pad integrity, the lower slotway 94 may be formed by open slits or cuts. However, open slits or cuts permits the leakage of spills and the like to a greater degree than perforations. Alternately, like the other slotways and although less desirable, indicia may simply be provided on the various slotways or instructions may be given to a user to cut the slotways as required by scissors to fit the user's infant seat.

As apparent from the above description, the upper shoulder strap receiving slits sections 32, 38 and 40, as well as the lower Y-shaped slotway 94, are joined to outer edges of the infant seat liner. Consequently, straps can be placed in these positions without requiring the threading of the straps through slits. That is, the slits, slots and pathways are accessible from the side edges of the infant seat liner by opening access perforations leading to the desired slit, slot or pathway. For example, perforation 32, portions of perforation 36, and perforation 40 may be opened to permit access to the shoulder strap receiving slot 40. Similarly, section 110 of the lower leg strap receiving slotway may be opened to provide access to the sections 112, 115.

Figure 10:
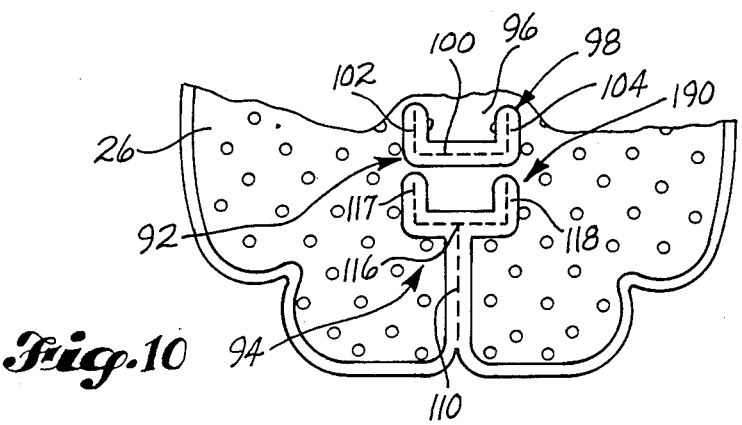
FIG. 10 is a front view of the leg or crotch receiving strap portions of another form of infant seat liner of the present invention.

As shown in FIG. 10, the lower crotch strap receiving slotway 94 may take other forms and still have spaced apart or diverging strap receiving slits, in this case slits 117, 118 arranged to form a U-shaped strap receiving area above the end 116 of access slit 110.

Referring again to FIG. 1, and although variable, an optimum design which fits substantially all commercially available infant seats intended for children from twenty to forty pounds has a spacing along the longitudinal axis of the liner of about (a) 13¼ inches from slot 100 to path section 32; (b) 15⅜ inches from slot 100 to path section 40; (c) 18-7/16 inches from slot 100 to path section 38; (d) 15½ inches from crotch slot point 116 to path section 32; (e) 17⅝ inches from crotch slot point 116 to path section 40 and 20⅝ inches from crotch slot point 116 to path section 38. Dimensions of plus or minus one-fourth inch from those specified also provide a reasonably good fit of many infant seat liners. Again, other dimensions will be suitable for more specific infant seat designs.

The lower most portion of lower section 26 forms the front skirt of the infant seat liner for supporting the legs of an infant positioned on the liner in an infant seat. The skirt portion of the liner is narrower than adjacent wider portions of the liner. This skirt portion is also substantially rectangular, is wider than it is long, and has rounded corners. The skirt section is approximately three inches in length and has a width of from approximately seventeen to eighteen inches, with the optimum width being about eighteen inches.

The liner 20 is symmetrical about the longitudinal center line of the liner. In addition, the perforation 110 is typically positioned along the longitudinal center line of the liner.

The illustrated FIG. 2 liner is shown with rounded corners and edges to give it a rounded, smooth and soft appearance. It should be understood that the article may have squared corners and edges such as shown in FIGS. 8 and 9. However, this would not be as appealing as the FIG. 2 design.

The infant seat liner 20 may be releasably adhered to the infant seat. As shown in FIG. 5, an adhesive type fastening system such as comprised of plural adhesive tapes may be used to accomplish this fastening. These tapes utilize an adhesive which sticks to materials normally used for infant seats. These materials include vinyls, cloths and high impact plastics. The liner should also be easily removable without leaving an adhesive residue or film, and without causing the seat material to deform. Typical adhesive tapes that meet these requirements include commercially available product 401 and 404 adhesive tape from the 3M Company of St. Paul, Minnesota. Of course, adhesive applied directly to the infant seat liner and covered by a removable cover strip is also suitable. Also, hook and loop fabric fastening systems may be used.

With reference to FIG. 5, the illustrated taping system includes a pair of upper tape strips 122, 124 and a pair of lower tape strips 126, 128. As shown in FIG. 6, and with reference to tape strip 122, these strips include a peelable cover layer 130 which is removed, as indicated by arrow 132, to expose an adhesive layer on a substrate 134 which is adhesively secured to the liner. The exposed adhesive layer of substrate 134 adheres to the infant car seat when the infant seat liner is in position.

The tapes 122-128 are applied longitudinally with the pad and extend from a position adjacent the edge of the pad toward the center of the pad. The strips are typically each positioned with about two and three-fourths inches from the longitudinal center line of the pad to the center line of each strip. Because of the nature of stresses applied to an infant seat liner, it requires less tape to hold the liners in place when the tapes are oriented longitudinally with the liner than when the tapes are applied transversely. For example, one-inch by four-inch product 404 tape applied longitudinally satisfactorily holds the liner in place on an infant seat for the life of the pad, typically two weeks to a month or more. The same tape strips applied transversely tend to be pulled free of the infant seat liner.

FIGS. 7-9 illustrate other embodiments of infant seat liners in accordance with the invention. Elements of these embodiments, which correspond to elements of the FIG. 2 liner, are given like numbers for convenience. These common elements will not be discussed in detail.

Referring to FIG. 7, in contrast to the lower slotway 94 of FIG. 2, the slotway 94 of the liner 140 of this figure is of a generally T-shaped configuration. This lower slotway has a vertical section 142 and a transverse section 144 positioned below the flap 96. The FIG. 7 version of slotway 94 is operable in the same manner as the Y-shaped slotway of FIG. 2. However, the illustrated T-shaped slotway 94 restricts the shifting of the liner 140 to a greater degree than the Y-shaped design. Therefore, infant seat liner 140 is somewhat less versatile than the liner 20. However, liner 140 will still fit a number of types and sizes of infant seats.

In the FIG. 8 form of liner 160, the shoulder strap receiving pathways 28, 30 have been modified to eliminate middle strap sections (i.e. like section 40 in FIG. 2). Also, the slotways 92 and 94 are like the slotways of FIG. 7, except that the upper slotway 92 comprises a transverse slit or perforation instead of an upwardly facing U-shaped slotway. Although satisfactory in many applications, the FIG. 8 liner 160 is not as versatile as either FIG. 2 or FIG. 7 forms of liners.

FIG. 9 shows a further embodiment of an infant seat liner 180 according to the invention. The liner 180 has shoulder strap receiving pathways 28 and 30 which have been modified to eliminate the upper shoulder strap section (i.e. 42 in FIG. 2). In addition, the lower leg strap receiving slotways 94, 96 are similar to those in FIG. 8. Also, the arched cuts 70, 72 of the previously discussed liners are replaced by indentations 182, 184 in central section 24 of the infant seat liner. The embodiment of FIG. 9 is particularly adapted to fit a wide variety of infant carriers and infant seats for smaller infants, such as up to about twenty lbs.

As previously noted, it is desirable for infant car seat liners to have other attributes. For example, such liners should be absorbent to hold spills that may occur. In addition, the liners should not transmit the spills to the car seat itself, but instead should retain the spills within the liner. Also, the liner should provide insulation against hot and cold temperatures and should not retain heat. Moreover, the infant seat liner should be stiff enough to be placed in the seat and hold its shape, but still be able to conform to the shape of the seat. In addition, the infant seat liner should be sufficiently durable to maintain its integrity during use and should not be pulled apart easily. Also, infant seat liners of the disposable type should be relatively inexpensive and cost effective to manufacture so that they can be discarded when they become soiled.

In accordance with the present invention, integrity is maintained in part by the use of selectively openable perforated or weakened sections Only those perforations necessary to accommodate straps of a particular user's infant car seat are opened during use of the liner. The remaining perforations assist in holding the liner together. Integrity is also enhanced by bonding layers of the infant seat liner together during formation as indicated by discrete compressed and quilted embossed areas 194 in FIG. 8. In addition, the entire periphery of the infant seat liner is typically bonded as shown at 196 in FIG. 2. Also, slotways and other areas of the infant seat liner in which perforations are formed are typically bonded, as indicated by the bonded area 42 in FIG. 2. Although the need for these bonds varies with the type of material being used, when a liner is formed of a material such as explained below, these bonds are typically formed by the application of heat and pressure.

Although variable, the material used for the infant seat liners of the invention typically has a taber stiffness of approximately twenty to fifty g-cm. An exemplary liner material also has an absorbency capacity of greater than five milliliters for each gram of core material included in the pad.

As shown in FIG. 6, a suitable infant seat liner is comprised of three layers including a face sheet 200, a core 202, and a backing sheet 204.

The face sheet is typically a non-woven material which may be imprinted with a design. The non-woven material is liquid permeable and allows spilled material to pass through it and into the absorbent core layer 202. Typical facing layers are of materials such as spun laced, resin bonded, spun bonded or carded thermoplastic containing or thermoplastic materials such as polyester and polypropylene.

The core layer is typically a combination of thermoplastic and other fibers such as chemical wood pulp and Pulpex ®. Pulpex is a material available from Hercules Corporation and described in U.S. Pat. No. 4,458,542. Other thermoplastic materials may also be used. A typical mixture is comprised of 80% by weight pulp and 20% by weight Pulpex. However mixture of from 60-95% pulp and 5-40% thermoplastic materials are suitable. The core material 202 is applied in an amount of between 150 and 300 gm/m as a typical example. In addition, during formation, the core and facing sheet are typically heated so that the core fibers become thermobonded together and also become thermobonded to the facing sheet. The compressed and bonded and sealed areas (i.e. bonds 190 in FIG. 2 and 194 in FIG. 8) are placed so that the material typically has a bulk of at least 1 cc/gm. The peripheral edge of the infant seat liner is typically bonded, such as indicated at 196 (FIG. 2). Also, bonds are formed to accommodate the perforations (i.e. at 42 in FIG. 2). Typically, these bonds are formed by heat embossing with bonds 190 and 194 being formed before the other bonds. Latex adhesive or other bonding approaches may be used whether or not the core, facing or backing sheets contain thermoplastic materials.

The backing sheet 204 typically comprises a liquid impermeable film which may be breathable. In one form, the backing 204 is fire resistant film which is adhesively bonded or otherwise secured to the core 202 at every point of contact with the core. An exemplary fire resistant film is GF19 film available from Consolidated Thermoplastics of Arlington Heights, Illinois. The composite infant car seat liner constructed with this film and a basis weight of 250 gm/m$^2$ has a fire resistance of about 3.5 lineal inches to 4 lineal inches per minute when tested in accordance with Federal Motor Vehicles Safety Standard 302. Without the fire retardant film, or other mechanisms for achieving fire resistance such as incorporating fire retardant chemicals in the core or on the surface of the core, the liner has a fire resistance of from about 5 to 11 lineal inches per minute when tested in this manner. The film may be positioned after the core and facing sheet are bonded together and embossed field bond areas have been provided. Alternately, the film may be of a type which is bonded to the core during the embossing step.

Other exemplary materials and methods of manufacturing these materials are described in U.S. patent application Ser. No. 07/187/813, filed on the same day as this application, entitled "Method of Making a Pad or Other Article", invented by Douglas E. Redford, et al. and assigned to Weyerhaeuser Company, the assignee of the present invention. This patent application is incorporated by reference herein.

Following assembly, the infant seat liner is cut to shape, for example, by a die, water knife, or laser. Perforations may also be formed in the liner, for example, by placing a screen or perforated template over the area to be perforated. The water knife is then passed over the template to form the perforations. Also, perforations can be formed by interrupting a water knife stream or laser as cuts are being made to form the perforations. Mechanical deflectors or a selectively applied air stream may also be used to divert the water knife stream away from the liner to form the perforations. With edges of the infant seat liner being bonded as described, the edges are sealed with all three layers extending to and forming the edge. This strengthens the edge and minimizes the escapement of dust. However, the liners may be cut slightly outside of the diversified peripheral margins to provide a soft edge. In addition, when the perforations are positioned in the densified or bonded areas of the infant seat liner, the perforations are typically formed at locations where the pad remains sealed by the bonds.

Having illustrated and described the principles of my invention with reference to several preferred embodiments, it will be apparent to those of ordinary skill in the art that the invention may be modified in arrangement and detail without departing from such principles. For example, other suitable materials for the infant seat liner may be used in place of those described. In addition, the dimensions may be varied from the optimum dimensions described above. Therefore, we claim as our invention all such modifications as come within the scope of the following claims.

We claim:

1. A disposable infant seat liner for car seats of the type having a pair of shoulder straps and at least one leg strap comprising:
    a body of sheet material including a liquid permeable facing sheet, an absorbent core comprising fiber material and a liquid impermeable backing sheet, the body including an upper shoulder supporting section with first and second side edges, a central section and a lower leg supporting section;

means defining a first shoulder strap receiving pathway extending inwardly along a first path section toward the center of the body from the first side edge of the upper body section to a first location, upwardly from the first location along a second path section to a second location and outwardly from the second location along a third path section toward the first side edge, and terminating short of the first side edge, the first shoulder strap receiving pathway also including a fourth path section between the first and third path sections and extending outwardly toward the first side edge from the second path section, the fourth path section terminating short of the first side edge; and means defining a second shoulder strap receiving pathway extending from the second side edge of the upper body section, the second shoulder strap receiving pathway being like the first shoulder strap receiving pathway.

2. A disposable infant seat liner according to claim 1 in which the first shoulder strap receiving slotway is generally E-shaped and the second shoulder strap receiving slotway is a mirror image of the first shoulder strap receiving slotway.

3. A disposable infant seat liner according to claim 1 in which the first and second shoulder strap receiving pathways each comprise selectively openable shoulder strap receiving pathways which are retained in a closed position until opened by a user to the extent selected by the user for positioning of shoulder straps therein.

4. A disposable infant seat liner according to claim 1 in which the first and second shoulder strap receiving pathways each comprise perforated shoulder strap receiving pathways which are retained in a closed position until the perforations are severed by a user to the extent selected by the user for positioning of shoulder straps therein.

5. A disposable infant seat liner according to claim 1 including means defining at least one leg strap receiving slotway in the lower leg supporting section.

6. A disposable infant seat liner according to claim 5 including means defining plural leg strap receiving slotways in the lower leg supporting section.

7. A disposable infant seat liner according to claim 6 in which the lower leg supporting section of the body has a lower edge and in which the plural leg strap receiving slotways comprise first and second leg strap receiving slotways, the first slotway being T-shaped with a leg section extending upwardly from a central portion of the lower edge of the lower body section and a transversely extending top section, the second slotway including a transversely extending section spaced from and positioned above the top section of the T-shaped slotway.

8. A disposable infant seat liner according to claim 7 in which the second slotway is U-shaped with a base which comprises the transversely extending section.

9. A disposable infant seat liner according to claim 8 in which the shoulder strap receiving pathways and leg strap receiving slotways are perforated for selective opening by a user.

10. A disposable infant seat liner according to claim 6 in which the lower leg supporting section of the base has a lower edge and in which the plural leg strap receiving slotways comprise first and second leg strap receiving slotways, the first slotway having a leg section extending upwardly from a central portion of the lower edge of the lower body section to a common location, the first slotway also including first and second strap receiving sections extending upwardly from the common location, and the second slotway including a transversely extending section spaced from and positioned above the top of the strap receiving sections.

11. A disposable infant seat liner according to claim 10 in which the second slotway is U-shaped with a base which comprises the transversely extending section.

12. A disposable infant seat liner according to claim 10 in which the spacing from the common location of the first slotway to the first path section along the longitudinal axis of the liner is about fifteen and one-half inches, from the common location to the fourth path section is about seventeen and five-eighths inches from the common location to the third path section is about twenty and eleven-sixteenths inches.

13. A disposable infant seat liner according to claim 12 in which the spacing from the transversely extending section of the second slotway to the first path section is about thirteen and one-fourth inches, from the transversely extending section of the second slotway to the fourth path section is about fifteen and three-eighths inches, and from the transversely extending section of the second slotway to the third path section is about eighteen and seven-sixteenths inches.

14. A disposable infant seat liner according to claim 10 in which the first slotway is generally Y-shaped.

15. A disposable infant seat liner according to claim 11 in which the shoulder strap receiving pathways and leg strap receiving slotways are perforated for selective opening by a user.

16. A disposable infant seat liner according to claim 11 in which the shoulder strap receiving pathways and leg strap receiving slotways are selectively openable by a user.

17. A disposable infant seat liner according to claim 1 including tape means attached to the body for detachably securing the body to the car seat, the tape means including an adhesive layer and a removable cover over the adhesive layer which is removed to expose the adhesive layer for securing the body to the car seat.

18. A disposable infant seat liner according to claim 17 in which the tape means includes first and second spaced apart upright tape strip means attached to the upper body section and third and fourth spaced apart upright tape strip means attached to the lower body section.

19. A disposable infant seat liner for car seats of the type having a pair of shoulder straps and at least one leg strap comprising:

a body of sheet material including a liquid permeable facing sheet, an absorbent core comprising fiber material and a liquid impermeable backing sheet, the body including an upper shoulder supporting section with first and second side edges, a central section and a lower leg supporting section, the lower leg supporting section having a lower edge;

means defining first and second shoulder strap receiving pathways; and means defining first and second leg strap receiving slotways in the lower leg supporting section, the first slotway having upwardly extending spaced apart leg strap receiving slot sections and an access section extending upwardly from a lower edge of the lower body section and the second slotway including a transversely extending section spaced from and positioned above the top of the leg strap receiving slot sections.

20. A disposable infant seat liner according to claim 19 in which the first slotway is Y-shaped.

21. A disposable infant seat liner according to claim 20 in which the second slotway is U-shaped with a base which comprises the transversely extending section.

22. A disposable infant seat liner according to claim 21 in which the shoulder strap receiving pathways and the leg strap receiving slotways are perforated for selective opening by a user.

23. A disposable infant seat liner according to claim 22 including means defining waist strap receiving slits, each such slit extending inwardly and downwardly from a respective side edge of the central portion of the body.

24. A disposable infant seat liner for car seats of the type having a pair of shoulder straps and at least one leg strap comprising:
  a unitary body of sheet material including a liquid permeable facing sheet, an absorbent core comprising fiber material and a liquid impermeable backing sheet, the body including an upper shoulder supporting section with first and second side edges, a central section and a lower leg supporting section, the lower leg supporting section having a lower edge;
  means defining first and second shoulder strap receiving pathways; and
  means defining first and second leg strap receiving slotways in the lower leg supporting section, the first slotway having a leg section extending upwardly from the lower edge of the lower body section and the second slotway including a transversely extending section spaced from and positioned above the top of the first slotway.

25. A disposable infant seat liner according to claim 24 in which the first slotway is T-shaped and the second slotway is U-shaped with a base which comprises the transversely extending section.

26. A disposable infant seat liner according to claim 25 in which the shoulder strap receiving pathways and the leg strap receiving slotways are perforated for selective opening by a user.

27. A disposable infant seat liner according to claim 26 including means defining waist strap receiving slits, each such slit extending inwardly and downwardly from a respective side edge of the central portion of the body.

28. A disposable infant seat liner according to claim 24 in which the first slotway has upwardly extending spaced apart leg strap receiving slot sections and an access section extending from the edge of the liner to the leg strap receiving slot sections.

29. A disposable infant seat liner according to claim 28 in which the leg strap receiving slot sections diverge from a common location.

30. A disposable infant seat liner according to claim 29 in which the first slotway is Y-shaped and the second slotway is U-shaped with a base which comprises the transversely extending section.

31. A disposable infant seat liner according to claim 30 in which the shoulder strap receiving pathways and the leg strap receiving slotways are perforated for selective opening by a user.

32. A disposable infant seat liner having a peripheral edge for car seats of the type having at least one leg strap comprising a body of a liquid permeable facing, a liquid impermeable backing and a core, the body having a leg supporting section and a first leg strap receiving slotway in the leg supporting section, the first leg strap receiving slotway having upwardly extending spaced apart leg strap receiving slot sections and an access section extending from the peripheral edge of the liner to the leg strap receiving slot sections.

33. A disposable infant seat liner according to claim 32 in which the leg strap receiving slot sections diverge from a common location.

34. A disposable infant seat liner according to claim 33 in which the first slotway is Y-shaped.

35. A disposable infant seat liner according to claim 34 having a second U-shaped leg strap receiving slotway.

36. A disposable infant seat liner according to claim 32 having a second leg strap receiving slotway positioned above the first leg strap receiving slotway.

37. A disposable infant seat liner for car seats of the type having a pair of shoulder straps and at least one leg strap comprising:
  a body including an upper shoulder supporting section with first and second side edges, a central section and a lower leg supporting section;
  a body of sheet material comprising fiber material, the body including an upper shoulder supporting section with first and second side edges, a central section and a lower leg supporting section;
  means defining a first shoulder strap receiving pathway extending inwardly along a first path section toward the center of the body from the first side edge of the upper body section to a path section to a second location and outwardly from the second location along a third path section toward the first side edge, and terminating short of the first side edge, the first shoulder strap receiving pathway also including a fourth path section between the first and third path sections and extending outwardly toward the first side edge from the second path section, the fourth path section terminating short of the first side edge; and
  means defining a second shoulder strap receiving pathway extending from the second side edge of the upper body section, the second shoulder strap receiving pathway being like the first shoulder strap receiving pathway.

38. An infant seat liner according to claim 37 including means defining plural leg strap receiving slotways in the lower leg supporting section.

39. An infant seat liner according to claim 37 including means defining first and second leg strap receiving slotways in the lower leg supporting section, the first slotway having a leg section extending upwardly from a central portion of the lower edge of the lower body section to a common location, the first slotway also including first and second strap receiving sections extending upwardly from the common location, and the second slotway including a transversely extending section spaced from and positioned above the top of the strap receiving sections.

40. An infant seat liner according to claim 39 in which the first slotway is Y-shaped.

41. An infant seat liner for car seats of the type having a pair of shoulder straps and at least one leg strap comprising:
  a body having an upper shoulder supporting section with first and second side edges, a central section and a lower leg supporting section, the lower leg supporting section having a lower edge;

means defining first and second shoulder strap receiving pathways; and means defining first and second leg strap receiving slotways in the lower leg supporting section, the first slotway having upwardly extending spaced apart leg strap receiving slot sections and an access section extending upwardly from a lower edge of the lower body section and the second slotway including a transversely extending section spaced from and positioned above the top of the leg strap receiving slot sections.

42. A disposable infant seat liner according to claim 41 in which the first slotway is Y-shaped.

43. A disposable infant seat liner having a peripheral edge for car seats of the type having at least one leg strap comprising a body having a leg supporting section and a first leg strap receiving slotway in the leg supporting section, the first leg strap receiving slotway having upwardly extending spaced apart leg strap receiving slot sections and an access section extending from the peripheral edge of the liner to the leg strap receiving slot sections.

44. A disposable infant seat liner according to claim 43 in which the leg strap receiving slot sections diverge from a common location.

45. A disposable infant seat liner according to claim 44 in which the first slotway is Y-shaped.

46. A disposable infant seat liner according to claim 43, having a second leg strap receiving slotway positioned above the first leg strap receiving slotway.

* * * * *